United States Patent
Tacke et al.

(10) Patent No.: US 8,528,865 B2
(45) Date of Patent: Sep. 10, 2013

(54) CONNECTING ARRANGEMENT FOR JOINING TWO STIFFENING ELEMENTS HAVING DIFFERENT CROSS-SECTIONAL PROFILES FOR AN AIRCRAFT OR SPACECRAFT, AND SHELL COMPONENT

(75) Inventors: Stefan Tacke, Buxtehude (DE); Hauke Lengsfeld, Helmste (DE); Volker Reye, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 115 days.

(21) Appl. No.: 12/838,950

(22) Filed: Jul. 19, 2010

(65) Prior Publication Data

US 2011/0011980 A1 Jan. 20, 2011

Related U.S. Application Data

(63) Continuation of application No. PCT/EP2008/067214, filed on Dec. 10, 2008.

(60) Provisional application No. 61/063,012, filed on Jan. 30, 2008.

(30) Foreign Application Priority Data

Jan. 30, 2008 (DE) .......................... 10 2008 006 834

(51) Int. Cl.
  *B64C 1/06* (2006.01)
(52) U.S. Cl.
  USPC ............................. 244/131; 244/132; 403/345
(58) Field of Classification Search
  USPC ................. 403/292, 293, 345, 364; 244/131, 244/132, 119, 120, 124; 52/655.1, 653.1, 52/713, 223.12, 245, 506.07, 665
  See application file for complete search history.

(56) References Cited

U.S. PATENT DOCUMENTS

| | | | | |
|---|---|---|---|---|
| 1,854,330 | A | * | 4/1932 | Delage .......................... 244/124 |
| 2,383,634 | A | * | 8/1945 | Watter ........................ 244/123.8 |

(Continued)

FOREIGN PATENT DOCUMENTS

| | | |
|---|---|---|
| DE | 10 2008 008455 | 10/2007 |
| DE | 10 2007 029500 | 1/2009 |

(Continued)

OTHER PUBLICATIONS

International Search Report for PCT/EP/2008/067214 dated Aug. 18, 2009.

(Continued)

*Primary Examiner* — Daniel P. Stodola
*Assistant Examiner* — Nahid Amiri
(74) *Attorney, Agent, or Firm* — Jenkins, Wilson, Taylor & Hunt, P.A.

(57) ABSTRACT

A connecting arrangement for connecting two reinforcing elements of an aircraft or spacecraft, wherein the reinforcing elements have different cross-sectional profiles with at least one foot portion and at least one comb portion, at least one foot portion connecting element which on one side can be adapted to the geometric shape of the foot portion of the first reinforcing element and on the opposite side can be adapted to the geometric shape of the foot portion of the second reinforcing element and can be connected rigidly thereto; and at least one comb portion connecting element which on one side can be adapted to the geometric shape of the comb portion of the first reinforcing element and on the opposite side can be adapted to the geometric shape of the comb portion of the second reinforcing element and can be connected rigidly thereto.

5 Claims, 8 Drawing Sheets

(56) References Cited

U.S. PATENT DOCUMENTS

| | | | |
|---|---|---|---|
| 3,004,645 A * | 10/1961 | Moul, Jr. | 244/131 |
| 3,827,661 A * | 8/1974 | Ryan et al. | 244/123.8 |
| 4,256,790 A * | 3/1981 | Lackman et al. | 428/73 |
| 4,813,202 A * | 3/1989 | Anderson | 52/281 |
| 5,518,208 A * | 5/1996 | Roseburg | 244/132 |
| 6,105,902 A | 8/2000 | Pettit | |
| 6,364,250 B1 * | 4/2002 | Brinck et al. | 244/119 |
| 6,375,120 B1 * | 4/2002 | Wolnek | 244/123.8 |
| 6,595,467 B2 * | 7/2003 | Schmidt | 244/119 |
| 6,684,593 B2 * | 2/2004 | Brenneis et al. | 52/630 |
| 7,205,066 B1 * | 4/2007 | Hammi et al. | 429/119 |
| 7,410,120 B2 * | 8/2008 | Russom et al. | 244/3.24 |
| 2006/0060705 A1 | 3/2006 | Stulc et al. | |
| 2006/0163438 A1 * | 7/2006 | Wojotowicz et al. | 248/300 |
| 2006/0249626 A1 * | 11/2006 | Simpson et al. | 244/123.1 |
| 2010/1018142 | 7/2010 | Noebel et al. | |
| 2010/0272954 A1 | 10/2010 | Roming et al. | |
| 2011/0095130 A1 | 4/2011 | Luettig | |

FOREIGN PATENT DOCUMENTS

| | | |
|---|---|---|
| DE | 10 2007 033868 | 1/2009 |
| DE | 10 2008 002117 | 12/2009 |
| EP | 1127785 | 8/2001 |
| RU | 2179136 | 2/2002 |
| SU | 967017 | 10/1991 |
| WO | WO 2009/146958 | 12/2009 |

OTHER PUBLICATIONS

German Office Action for DE 10 2008 006 834.9-22 dated Mar. 30, 2010.

Russian Decision to Grant for Application No. 2010128137/11 dated Dec. 10, 2008.

Chinese Office Action for Application No. 200880125939.3 dated Oct. 31, 2012.

* cited by examiner

CONNECTING ARRANGEMENT FOR JOINING TWO STIFFENING ELEMENTS HAVING DIFFERENT CROSS-SECTIONAL PROFILES FOR AN AIRCRAFT OR SPACECRAFT, AND SHELL COMPONENT

CROSS-REFERENCE TO RELATED APPLICATIONS

This application is a continuation of PCT/EP2008/067214 filed Dec. 10, 2008 and claims the benefit of U.S. Provisional Application No. 61/063,012 filed Jan. 30, 2008, and German Patent Application No. 10 2008 006 834.9 filed Jan. 30, 2008, the entire disclosures of which are herein incorporated by reference.

FIELD OF THE INVENTION

The present invention relates to a connecting arrangement for connecting two reinforcing elements having different cross-sectional profiles for an aircraft or spacecraft, and to a shell component.

Although the present invention and the problem on which it is based can be applied to any shell components, in the following they will be described in detail in respect of fibre composite components, for example carbon fibre plastics material (CFRP) components, for example skin shells of an aircraft.

It is generally known to reinforce CFRP skin shells with reinforcing elements, so-called CFRP stringers, in order to withstand the high stresses which occur in the aircraft or spacecraft sector while adding as low an additional weight as possible. In this respect, two types of stringers are basically distinguished: T-stringers and omega stringers.

T-stringers have a narrow head portion and a wide foot portion. They are connected to the skin shell at the foot portion and are advantageous in that they are simple to produce.

Omega stringers have an approximately hat-shaped profile, the ends of which being connected as the foot portion to the skin shell.

The use of fibre composite components is widespread in aircraft construction. They are produced, for example by vacuum infusion processes for introducing a matrix, for example an epoxy resin, into fibre semi-finished products, and by subsequent curing. Compared to other known processes for the production of fibre composite components, for example the prepreg process, infusion processes can be cost-effective, because they allow the use of cheaper fibre semi-finished products.

Thus, reinforcing stringers of different profile shapes are presently indispensable in the production of shell components for aircraft construction. Due to the static load specifications and an attempt to produce the structures such that they are as light as possible, conform to production requirements and are easy to service, it may be necessary in some areas to join different stringer profile shapes together.

DE 10 2006 008 455 A1 describes a method and a device for attaching a connection means to a stringer. This document does not mention connecting stringers of different profiles.

SUMMARY OF THE INVENTION

Against this background, the object of the present invention is to provide a connecting arrangement for reinforcing elements in order to overcome or to significantly reduce the disadvantages mentioned above.

This object is achieved according to the invention by a connecting arrangement which has the features of the claims.

According thereto, a connecting arrangement is provided for connecting two reinforcing elements of an aircraft or spacecraft. The reinforcing elements have different cross-sectional profiles with in each case at least one foot portion and at least one comb portion. The connecting arrangement has at least one foot portion connecting element which can be adapted on one side to the geometric shape of the foot portion of the first reinforcing element and can be adapted on the opposite side to the geometric shape of the foot portion of the second reinforcing element and can be rigidly connected thereto in each case. Furthermore, the connecting arrangement has at least one comb portion bonnecting element which can be adapted on one side to the geometric shape of the comb portion of the first reinforcing element and can be adapted on the opposite side to the geometric shape of the comb portion of the second reinforcing element and can be rigidly connected thereto in each case.

A shell component of an aircraft or spacecraft is also provided. This shell component has at least two reinforcing elements of different cross-sectional profiles. These reinforcing elements are connected in their longitudinal direction by a connecting arrangement described above.

Advantageous embodiments and improvements of the present invention are provided in the subclaims.

A fundamental idea of the invention is to provide a connecting arrangement which has a foot portion connecting element and a comb portion connecting element which are adapted to the different geometric shapes of the reinforcing elements to be connected.

Thus, compared to the approaches mentioned at the outset, the present invention has the advantage, inter alia, that in one embodiment it is possible to couple reinforcing elements with different cross-sectional profiles, even when they are offset, without additional shims, while in another embodiment it is possible to couple reinforcing elements with different cross-sectional profiles on a shell component as well as at a connection point of shell elements of a shell component using the same connecting arrangement and, in so doing, to have a minimal outlay of parts.

A preferred embodiment provides that a respective foot portion connecting element and a comb portion connecting element can be connected on the corresponding foot portions and comb portions on both sides of the comb portions of the reinforcing elements to be connected. This connection can be performed by riveting, for example.

In one embodiment, the foot portion connecting elements are configured as L-shaped profiled parts, but can also be a flat material, for example. It is easily possible to make individual adaptations by a construction method which is independent of the comb portion connecting elements.

In a preferred embodiment, the comb portion connecting elements are provided in a mirror-inverted configuration on both sides of the comb portions, to be connected, of the reinforcing elements. When the reinforcing elements are offset laterally, the offset can be balanced by different height arrangements of the same comb portion connecting elements without intermediate layers or shims.

The foot portion connecting elements can be cut into lengths from the same profiled bar, for example for both sides of the connecting arrangement, in which case a mirror-inverted configuration is unnecessary.

In this respect, the comb portion connecting element has a coupling surface for connecting to the first reinforcing element and a coupling profiled surface for connecting to the second reinforcing element, the coupling surface and the coupling profiled surface being connected by a connecting web along longitudinal connecting edges. Consequently, if the comb portion connecting element is made of metal, for example, it can be formed in one operation as an economical stamped bent part. However, it is also possible to configure the comb portion connecting element as a composite material part in CFRP or the like. In the case of a curved comb portion connecting element, it is possible to easily check the different profiles of the reinforcing elements in the longitudinal direction of the curved comb portion connecting element, which greatly simplifies maintenance and testing procedures in respect of checks for crack formation, since the components do not have to be dismantled, but merely inspected.

The foot portion connecting element is preferably configured as an L-shaped profiled part and can thus be cut into lengths as bars in a particularly cost-effective manner. Other profile shapes are of course conceivable. The foot portion connecting elements can be cut into lengths from the same profiled bar, for example for both sides of the connecting arrangement, in which case a mirror-inverted configuration is not required.

The reinforcing elements can be configured, for example as T-stringers and omega stringers.

In an alternative embodiment, it is preferred that the comb portion connecting element is configured integrally with a foot portion connecting element. In this respect, the foot portion connecting element can be configured integrally as a foot coupling surface with the coupling profiled surface and/or with the coupling surface of the comb portion connecting element. This is particularly advantageous in the case of reinforcing elements whose centre axes align in the longitudinal direction, because the number of parts is further reduced. However, laterally offset reinforcing elements can also be coupled therewith, in that shims can be used for tolerance compensation.

It is preferred that at least one foot portion of the reinforcing elements is widened at the connection point of the reinforcing elements. This provides a relatively large contact surface for the foot portion connecting elements to achieve an advantageously high transmission of force and increase in rigidity.

A further embodiment provides that the reinforcing element configured as an omega stringer has in its upper side in the region of the connecting arrangement a recess which runs in the longitudinal direction and which simplifies a check and inspection of the reinforcing elements.

In the case of a shell component with two shell elements joined together by a transverse butt strap, reinforcing elements of different profile cross sections, being laterally offset in their longitudinal direction, are connected at the connection point of the shell elements by the alternative connecting arrangement described above or are connected by means of a described connecting arrangement using additional shims for a tolerance compensation. In this respect, the foot portion connecting elements, whether they are configured separately from or integrally in one piece with the comb portion connecting elements, for example as foot coupling surfaces, are rigidly connected to the transverse butt strap, thereby considerably increasing the rigidity and force transmissibility of the connection point.

On the one hand, the independent configuration of the construction elements of the connecting arrangement economises on shims where the reinforcing elements are in an offset arrangement and on the other hand, for the integral method of construction, in other words when the foot portion connecting elements are configured integrally with the comb portion connecting elements, the number of components is reduced, but production times are shortened in both versions. The open method of construction in the form, for example of stamped bent parts and recesses in the reinforcing elements not only makes it possible to carry out an inspection, but also makes it simpler and quicker to do so.

BRIEF DESCRIPTION OF THE DRAWINGS

In the following, the invention is described in detail on the basis of embodiments with reference to the following figures of the drawings, of which.

DESCRIPTION OF EXEMPLARY
EMBODIMENTS

In the figures, the same reference numerals denote the same or functionally identical components, unless indicated otherwise.

Figure 1:
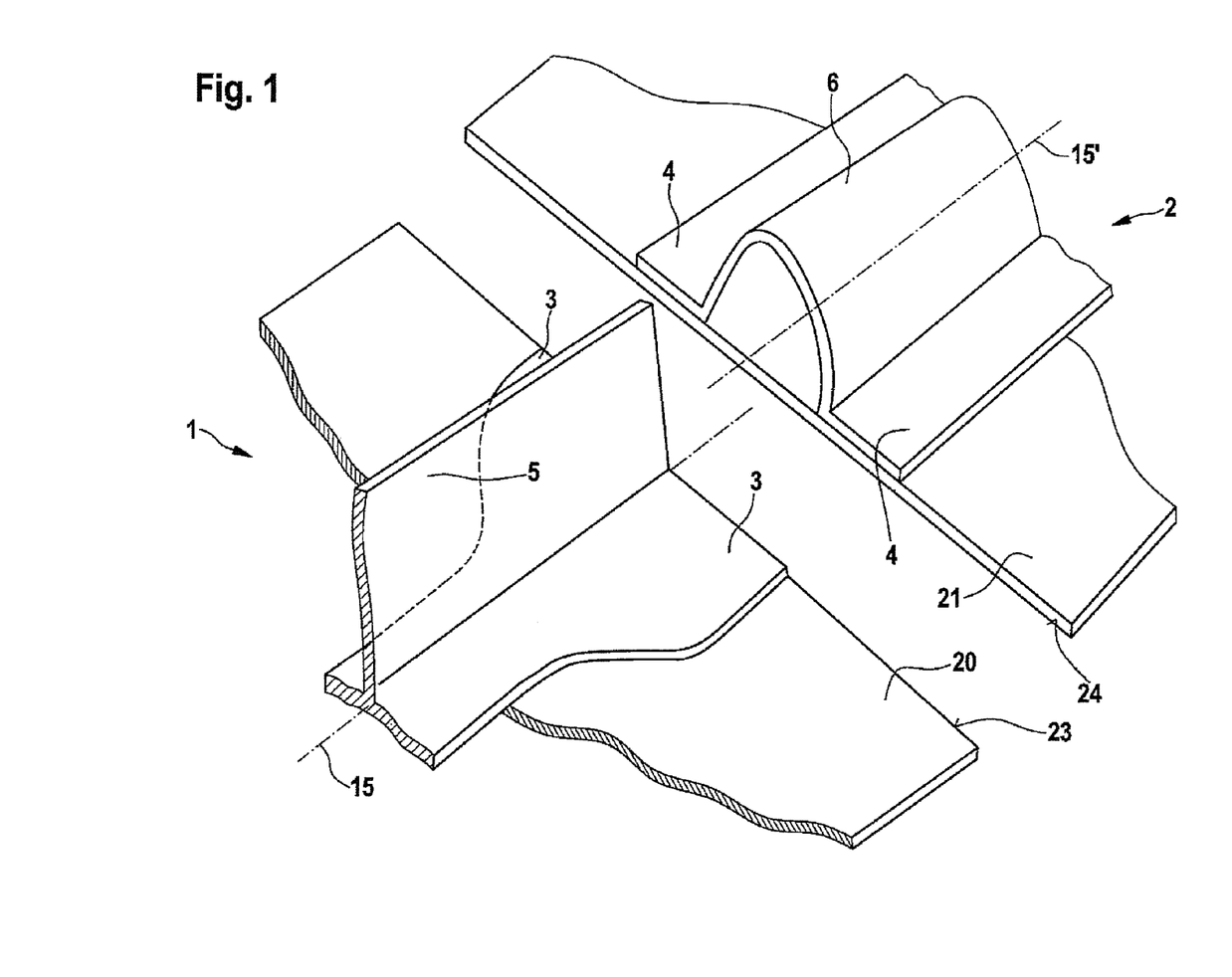
FIG. 1 is a schematic view of two reinforcing elements of different profile cross sections with shell elements.

FIG. 1 is a schematic view of two reinforcing elements 1, 2 of different profile cross sections with centre axes 15, 15' which run in the longitudinal direction of said reinforcing elements 1, 2. The reinforcing elements 1, 2 are applied here on shell elements 20, 21, for example of a shell component, for the reinforcement thereof. The shell elements 20, 21 are, for example skin shells for an aircraft and are produced from a fibre composite material, although a metallic material is also possible.

In this case, the two reinforcing elements 1, 2 are arranged on the edge of a connection point of the shell elements 20, 21. At this connection point, the shell elements 20, 21 have transverse joint edges 23, 24 on which they rest against one another when connected. This connection is described further below.

The first reinforcing element 1 is configured here as a T-stringer with a foot portion 3 and a comb portion 5. In contrast thereto, the second reinforcing element 2 has a hollow profile cross section with a comb portion 6 and a foot portion 4 and, in this configuration, is also termed an omega stringer. When the shell elements 20, 21 are joined together, the reinforcing elements 1, 2 also have to be connected for reinforcement and for the transmission of force. FIG. 1 shows the reinforcing elements 1, 2 on the edge of the shell elements 20, 21. However, it is also possible for the two reinforcing elements 1, 2 of different profile cross sections to be arranged anywhere on the surface of a shell component or a shell element 20, 21 and to be joined together.

Figure 2:
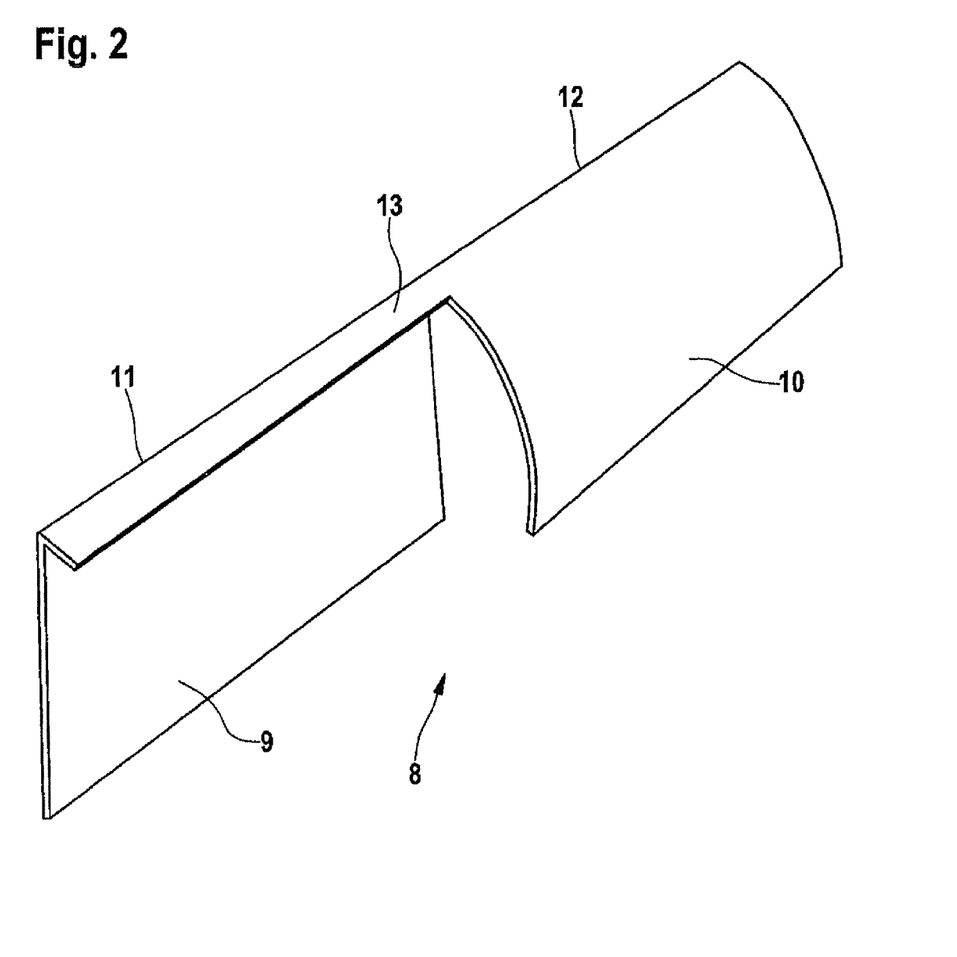
FIG. 2 shows an embodiment of a comb portion connecting element of a connecting arrangement according to the invention.

To join together the reinforcing elements 1, 2 of different profile cross sections, the foot portions 3, 4 as well as the comb portions 5, 6 have to be connected positively and non-positively using a connecting arrangement. This is indicated by a comb portion connecting element 8 which is shown in FIG. 2 as one embodiment of a connecting arrangement according to the invention. FIG. 2 will be described together with FIG. 3 which is a schematic perspective view of a first embodiment of a connecting arrangement of the invention with the comb portion connecting element 8 according to FIG. 2 for the reinforcing elements 1, 2 according to FIG. 1.

The comb portion connecting element 8 has a planar coupling surface 9 which corresponds to the comb portion 5 of the first reinforcing element 1, the T-stringer. Formed integrally with a longitudinal connecting edge 11, positioned above in FIG. 2, of the coupling surface 9 is a connecting web 13 which stretches over the entire longitudinal connecting edge 11, also further extends in its longitudinal direction and is connected to a longitudinal connecting edge 12 of a coupling profiled surface 10. The shape of the coupling profiled surface 10 corresponds to the outer surface of the second reinforcing element 2, the omega stringer. In this example, the connecting web 13 is bent over along the longitudinal edges 11 and 12 by a previously determined extent and by a specific radius in each case, such that a specific rigidity of the comb portion connecting element 8 is achieved. The comb portion connecting element 8 can be produced from metal and/or fibre composite material. From metal, it can be easily produced as a stamped bent part, for example.

Figure 3:
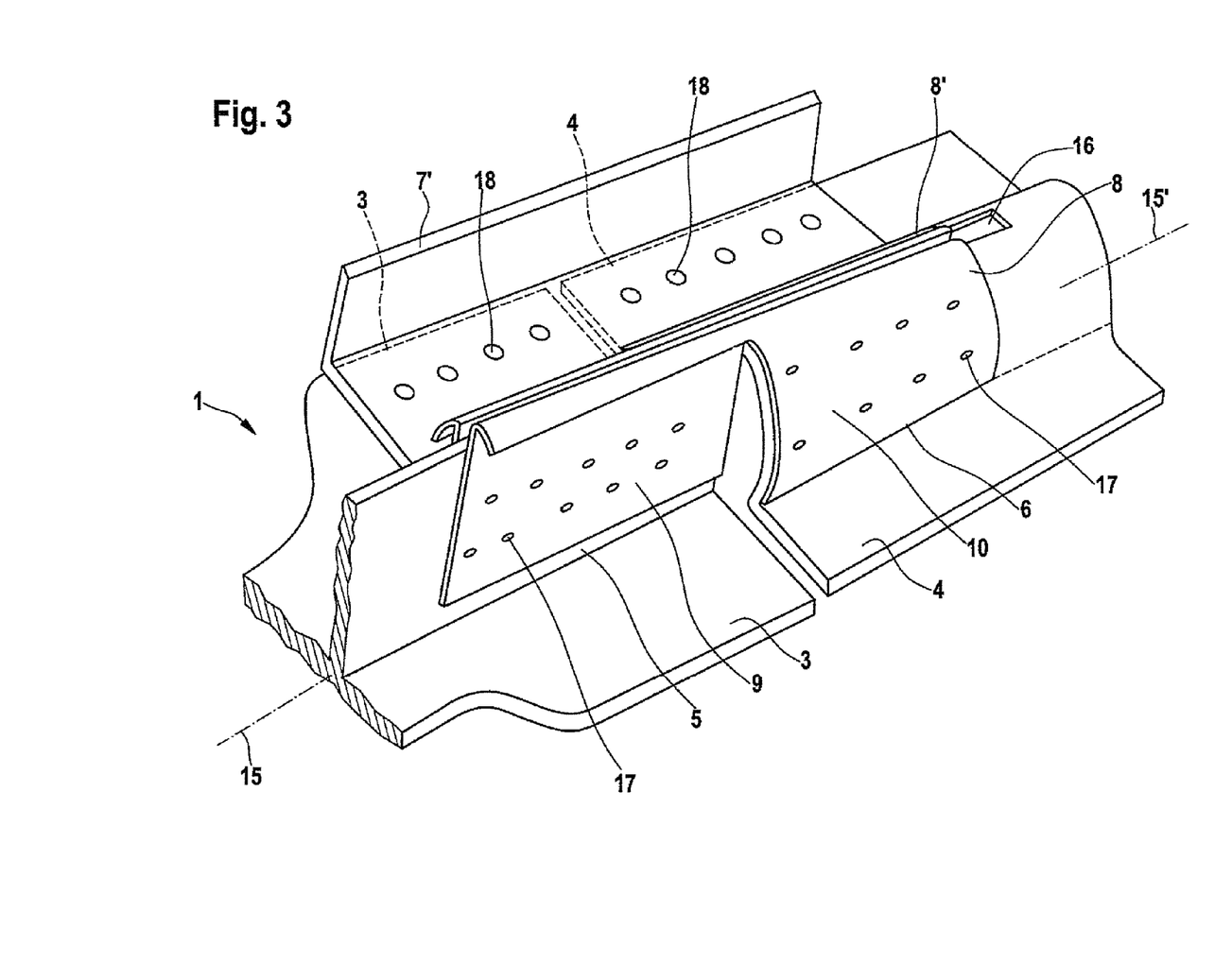
FIG. 3 is a schematic perspective view of a first embodiment of a connecting arrangement according to the invention with the comb portion connecting element according to FIG. 2 for the reinforcing elements according to FIG. 1.

In FIG. 3, the two reinforcing elements 1, 2 are applied, for example to a shell element (not shown) or also to the edges thereof, as shown in FIG. 1. The centre axes 15, 15' of the reinforcing elements 1, 2 are oriented in a line and are in alignment with one another. The comb portion connecting element 8 is fixedly mounted, for example by riveting, as a comb attachment 17 with the planar coupling surface 9 on the comb portion 5 of the T-stringer 1. On the side of the omega stringer 2, the coupling profiled surface 10 of the comb portion connecting element 8 is attached in the same manner to the comb portion 6 of the omega stringer 2. In this example, on the other side of the comb portions 5 and 6, a further, mirror-inverted comb portion connecting element 8' is attached with the same construction and in the same way to the comb portions 5 and 6 of the reinforcing elements 1 and 2 to be connected. This embodiment of the comb portion connecting elements 8, 8', namely that the coupling profiled surface 10 only commences approximately in the centre of the comb portion connecting element 8, 8', makes it easily possible to inspect the omega stringer 2 at the connection point through the gap produced thereby. From the other side of the omega stringer 2, this is also possible in this embodiment in that the second reinforcing element has here a recess 16 in its upper side in its longitudinal direction. Consequently, on the one hand a simple inspection is also possible and on the other hand the bent-over longitudinal connecting edge 12 can be accommodated here.

Foot portion connecting elements 7, 7', of which only one is shown here, are provided for connecting the foot portions 3 and 4 of the reinforcing elements 1, 2. Said foot portion connecting element 7, 7' is configured in this example as an L-shaped profiled part and, like the comb portion connecting element 8, 8', can be produced from metal and/or fibre composite material. As a profiled part, it can advantageously be cut into lengths simply as bar material. On its lower side, it rests on the foot portions 3, 4, to be connected, of the reinforcing elements 1, 2 and is rigidly connected thereto in foot attachments 18, for example by riveting. In order to obtain a large force transmission surface, the foot portion 3 of the T-stringer 1 has been widened in this example and adapted to the foot portion of the omega stringer 2. However, the widening at this connection point can be previously adapted in a corresponding manner according to the configuration.

Figure 4:
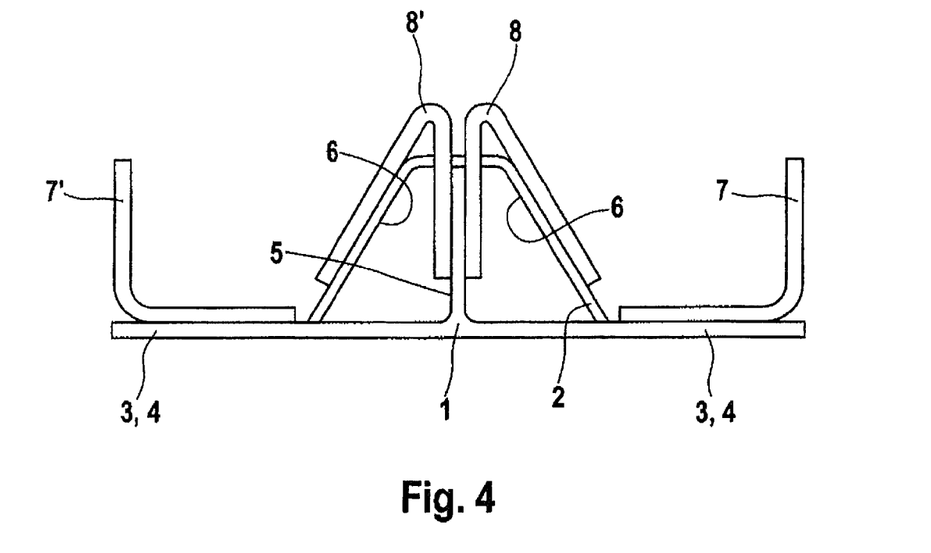
FIG. 4 is a side view in the longitudinal direction of the connecting arrangement of the invention according to FIG. 3 with a second foot portion connecting element, the centre lines of the reinforcing elements being in alignment.

In FIG. 3, the reinforcing elements 1, 2 are oriented with aligning centre axes 15, 15'. In this respect. FIG. 4 is a view of FIG. 3 in the direction of the centre axes 15, 15'. FIG. 4 also shows the second foot portion connecting element 7 which is not shown in FIG. 3. This arrangement is symmetrical to the plane in which the aligning centre axes 15, 15' run. It is also conceivable that instead of the double connecting elements 7, 7' and 8, 8' in each case, respectively only one of them (for example 7 and 8') can be used or they can be used in a different combination.

Figure 5:
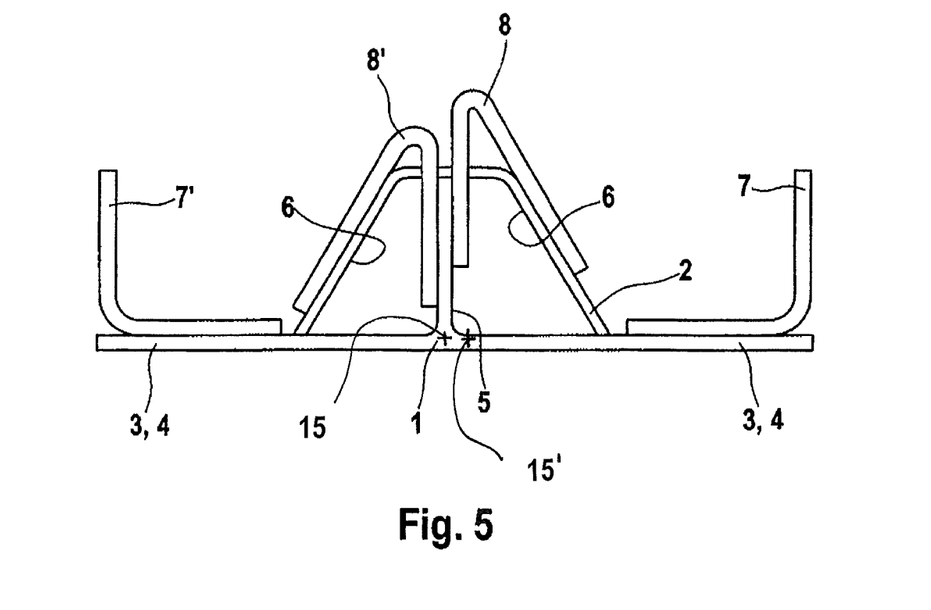
FIG. 5 is the view according to FIG. 4 where the centre lines of the reinforcing elements are laterally offset.

When there is a lateral offset of the centre axes 15, 15', as shown in FIG. 5 in a view, shown in the longitudinal direction of the centre axes 15, 15', of FIG. 3, compared to FIG. 4, this offset can advantageously be equalised without intermediate layers, also termed shims, with the first embodiment of the comb portion connecting element 8, 8' of the connecting arrangement according to the invention, within a specific tolerance range in that the two comb portion connecting elements 8, 8' are either moved upwards or downwards, depending on the offset direction, on the oblique outer surface of the omega stringer 2. Thus, a shim-free coupling between the comb portions 5 and 6 is ensured.

Figure 6:
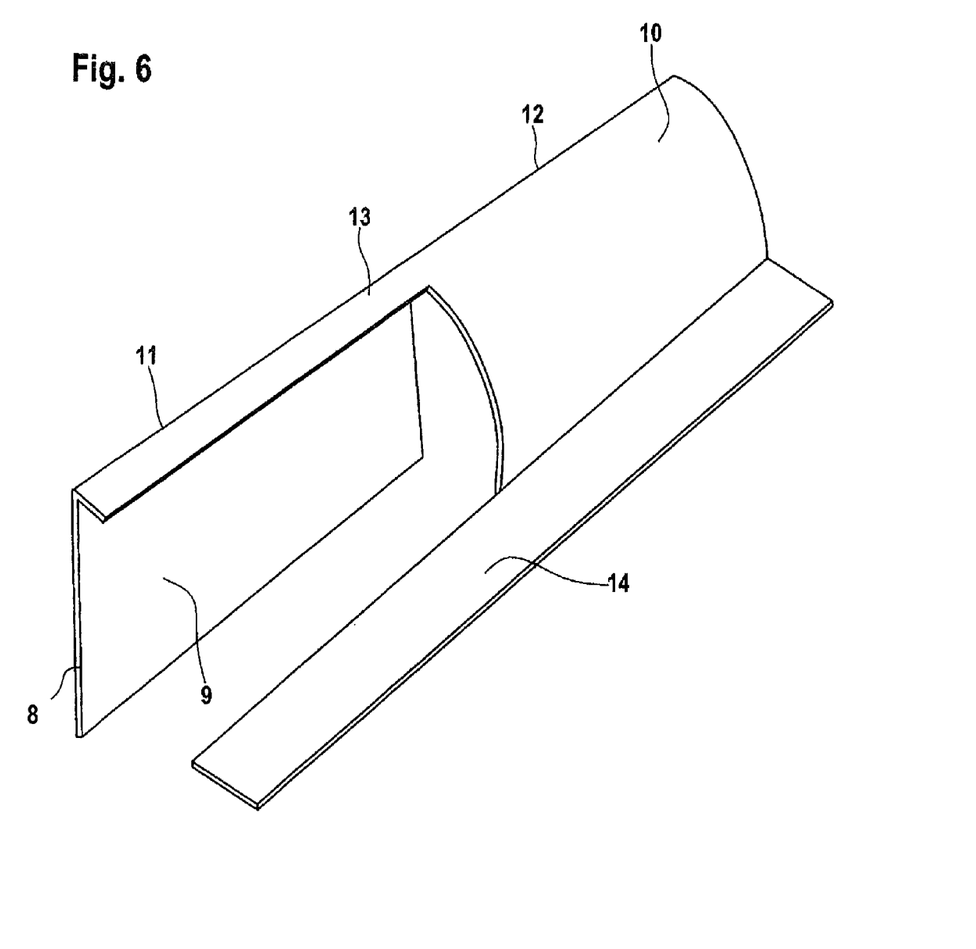
FIG. 6 shows a further embodiment of the comb portion connecting element of the connecting arrangement according to the invention.
Figure 7:
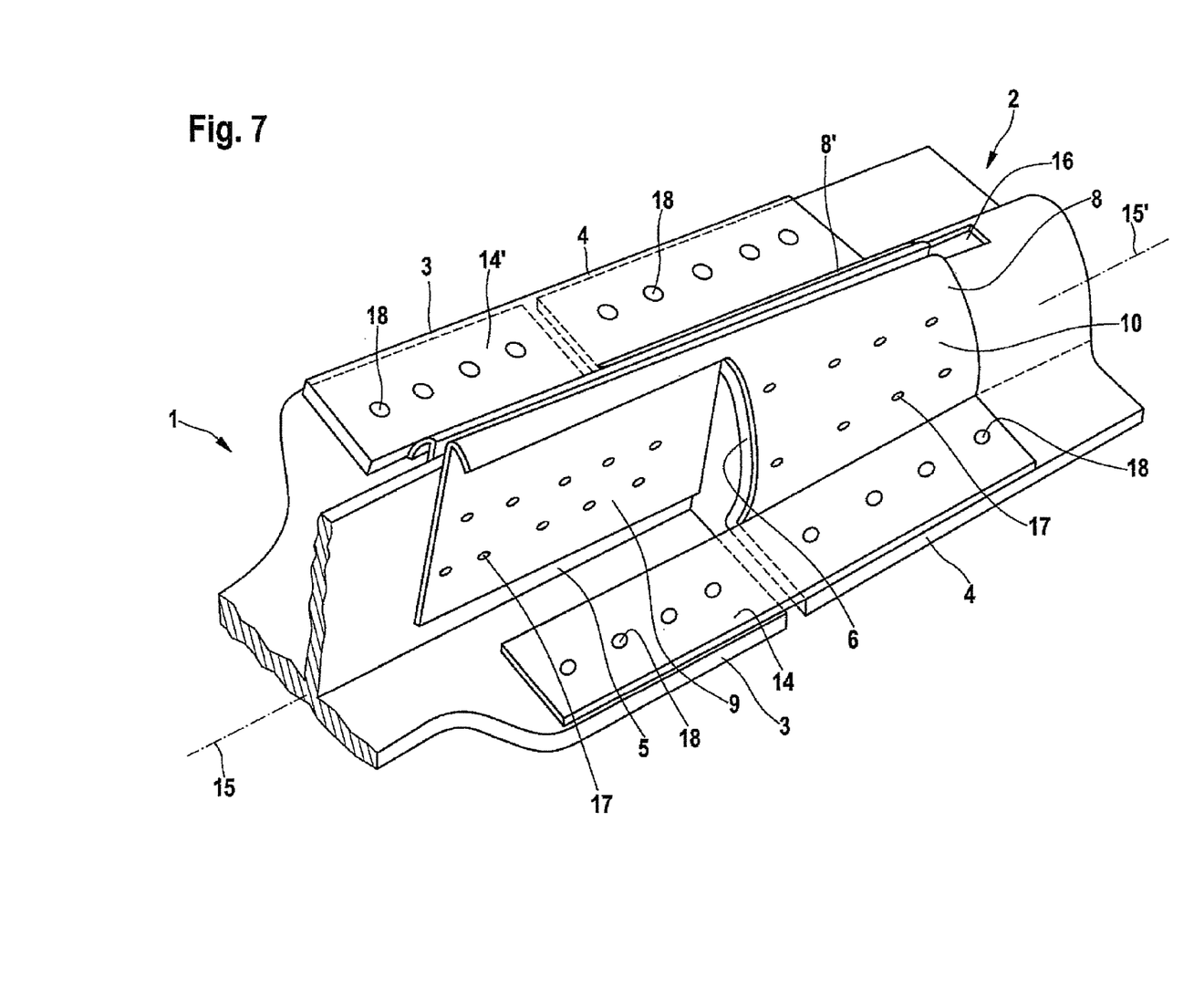
FIG. 7 is a schematic perspective view of a second embodiment of the connecting arrangement according to the invention with the comb portion connecting element according to FIG. 6 for the reinforcing elements according to FIG. 1.

A further embodiment of the comb portion connecting element 8 of the connecting arrangement according to the invention is shown in FIG. 6 which will be described in conjunction with FIG. 7. FIG. 7 is a schematic perspective view of a second embodiment of the connecting arrangement according to the invention with the comb portion connecting element 8 according to FIG. 6 for the reinforcing elements according to FIG. 1.

In this embodiment, the foot portion connecting element 7 in the form of a foot coupling surface 14 is configured in one piece or integrally with the comb portion connecting element 8. In this case, the foot coupling surface 14 is attached to a longitudinal edge of the coupling profiled surface 10, which longitudinal edge is opposite the longitudinal connecting edge 12. The rest of the comb portion connecting element 8 is constructed in the same way as the first embodiment according to FIG. 2. Of course, the foot coupling surface 14 can also be configured as an L-shaped profiled part or the like.

The mirror-inverted integral comb portion connecting element 8' is easy to imagine and is indicated in FIG. 7. FIG. 7 shows a construction similar to that of FIG. 3 and has already been described there. The difference compared to FIG. 3 is that the comb portion connecting elements 8, 8' are configured integrally with the foot portion connecting elements 7, 7', here as foot coupling surfaces 14, 14'. The foot coupling surfaces 14, 14' are rigidly connected to the foot portions 3, 4 of the reinforcing elements 1, 2 in foot attachments 18, for example by riveting.

The integral comb portion connecting element 8, 8' has the advantage of a small number of parts compared to the first embodiment. When there is a lateral offset of the centre axes 15, 15' of the reinforcing elements 1, 2, shims are to be used as intermediate layers for equalisation.

Figure 8:
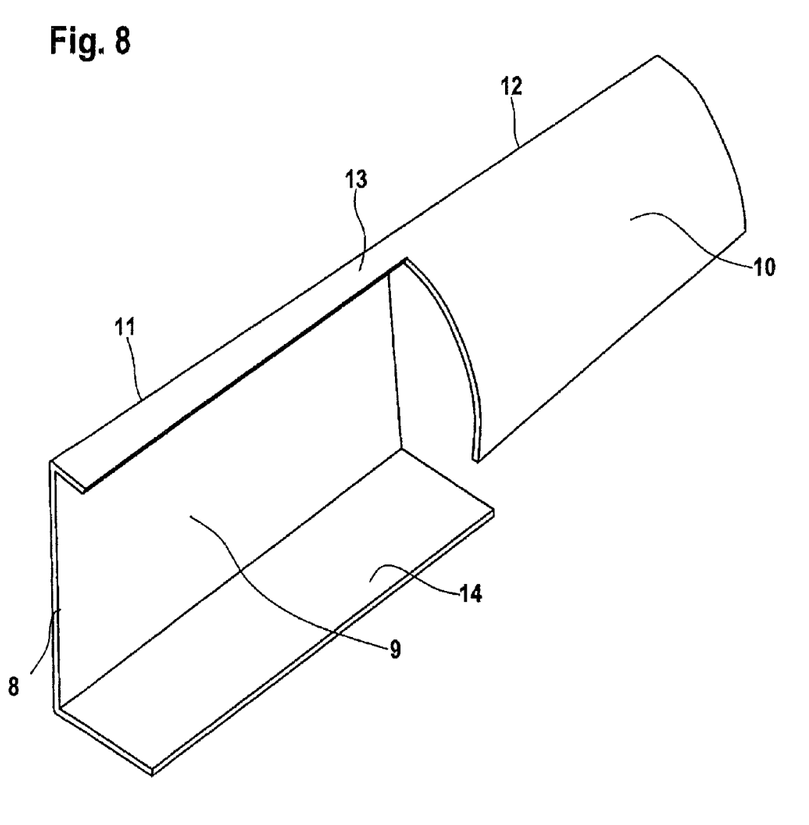
FIG. 8 shows yet another embodiment of the comb portion connecting element of the connecting arrangement according to the invention.

In yet a further embodiment of the comb portion connecting element 8, shown in FIG. 8, it is also possible for the foot portion connecting element 7 to be attached integrally with the planar coupling surface 9 of the comb portion connecting element 8. The description already provided in connection with FIGS. 6 and 7 applies here.

Figure 9:
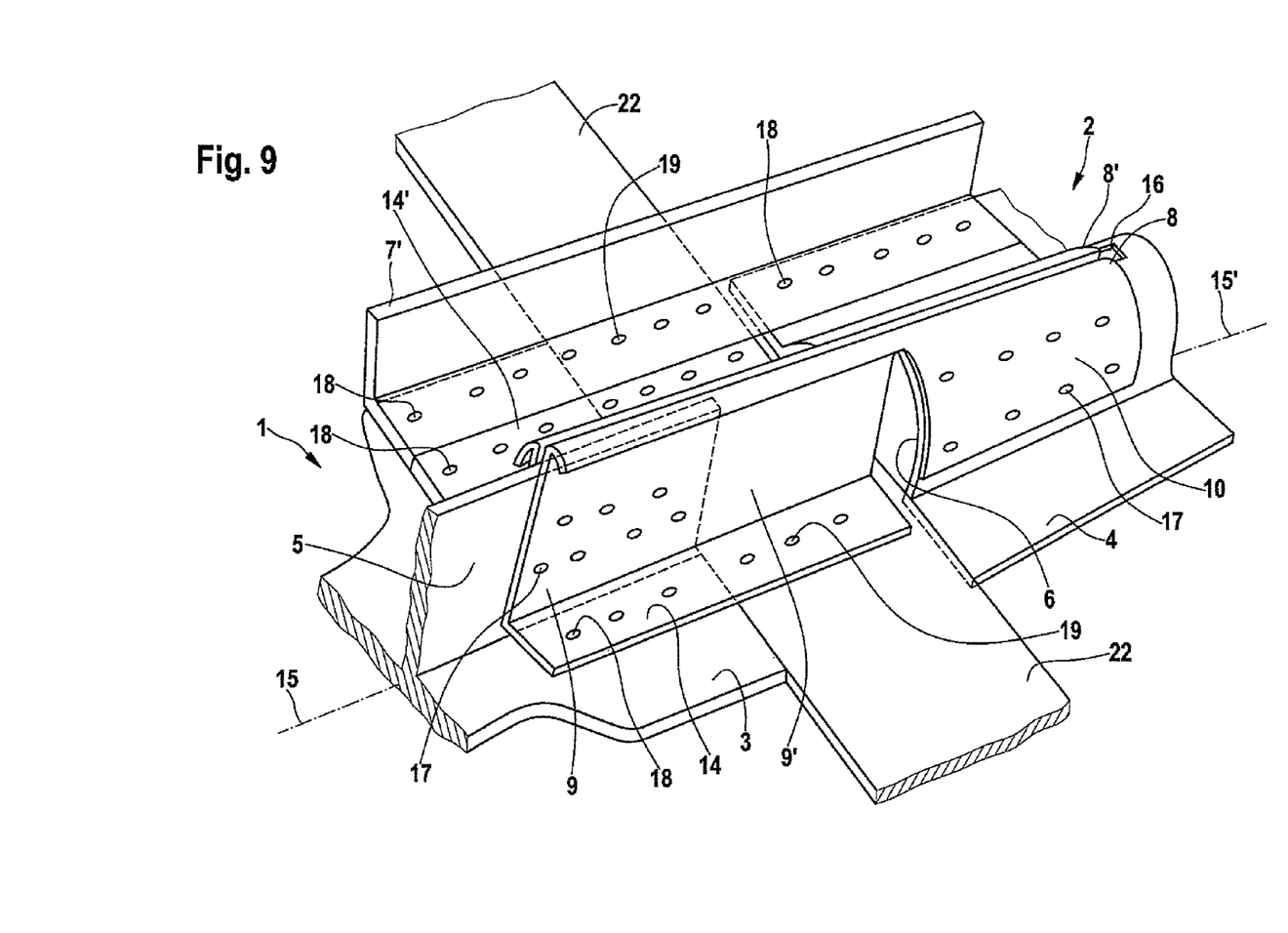
FIG. 9 is a schematic perspective view of a third embodiment of the connecting arrangement according to the invention with the comb portion connecting element according to FIG. 8 for the reinforcing elements according to FIG. 1 with a connecting joint of two shell elements.

Finally, FIG. 9 shows a third embodiment of the connecting arrangement according to the invention with the comb portion connecting elements 8, 8' of the embodiment according to FIG. 8 in an extension of the coupling surfaces 9 to 9' and thus of the integrally formed foot coupling surfaces 14, 14' at a connection point of the shell elements 20, 21 according to FIG. 1. In addition, the foot portion connecting elements 7, 7' are provided for connecting the foot portions 3 and 4, the foot portion connecting element 7 which would otherwise be in the foreground not being shown.

This connection point of the shell elements 20, 21 has a transverse butt strap 22 which is not described in more detail. Resting against both sides of this transverse butt strap 22 are the reinforcing elements 1, 2 and they have between them a gap which is bridged by the extended coupling surfaces 9'. As mentioned above, the comb portion connecting elements 8, 8' are connected to the corresponding comb portions 5, 6 of the reinforcing elements 1, 2. The foot coupling surfaces 14, 14' and the foot portion connecting elements 7, 7' are rigidly connected in foot attachments 18 to the foot portions 3, 4 of the reinforcing elements 1, 2, as stated above. In addition, the foot portion connecting elements 7, 7' and the foot coupling surfaces 14, 14' are also rigidly connected, for example by riveting, by their portions located above the transverse butt strap 22 to this transverse butt strap 22 in transverse butt strap attachments 19 to thus achieve a particularly high rigidity and strength of the connecting arrangement.

Although the present invention has been described here on the basis of preferred embodiments, it is not restricted thereto, but can be combined and modified in many different ways.

For example, the coupling surface 9 of the comb portion connecting element 8, 8' can extend further behind the coupling profiled surface 10. The coupling profiled surface 10 can also extend further in front of the coupling surface 9, as a result of which a greater strength and rigidity can be obtained.

The reinforcing elements 1, 2 to be connected using the connecting arrangement according to the invention can be arranged in any location on a shell element 20, 21, thus also at a connection point of the shell elements 20, 21 with or without a transverse butt strap 22.

Other profiled part shapes of the reinforcing elements 1, 2 are also possible.

In a connecting arrangement for connecting two reinforcing elements 1, 2 of an aircraft or spacecraft, the reinforcing elements 1, 2 having different cross-sectional profiles with in each case at least one foot portion 3, 4 and at least one comb portion 5, 6, there is at least one foot portion connecting element 7, 7' which on one side can be adapted to the geometric shape of the foot portion 3 of the first reinforcing element 1 and on the opposite side can be adapted to the geometric shape of the foot portion 4 of the second reinforcing element 2 and can be connected rigidly thereto in each case; and at least one comb portion connecting element 8, 8' which on one side can be adapted to the geometric shape of the comb portion 5 of the first reinforcing element 1 and on the opposite side can be adapted to the geometric shape of the comb portion 6 of the second reinforcing element 2 and can be connected rigidly thereto in each case. The connecting arrangement has a shell component with at least two reinforcing elements 1, 2 of different profile cross sections.

LIST OF REFERENCE NUMERALS 1, 2 reinforcing element (T-stringer, omega stringer)
3, 4 foot portion
5, 6 comb portion
7, 7' foot portion connecting element
8, 8' comb portion connecting element
9 coupling surface
10 coupling profiled surface
11 longitudinal connecting edge coupling surface
12 longitudinal connecting edge coupling profiled surface
13 connecting web
14 foot coupling surface
15, 15' centre axis
16 recess
17 comb attachment
18 foot attachment
19 transverse butt strap attachment
20, 21 shell element
22 transverse butt strap
23, 24 transverse butt edge

The invention claimed is:

1. A system comprising:
a shell component of an aircraft or spacecraft:
a T-stringer, wherein the T-stringer comprises a foot portion and a comb portion;
an omega stringer, wherein the omega stringer comprises a hollow profile cross section with a comb portion and a foot portion, and wherein the T-stringer and the omega stringer are applied to the shell component or to edges of the shell component;
a connection arrangement, wherein the connecting arrangement connects the T-stringer and the omega stringer in their longitudinal directions, the connection arrangement comprising:
at least one foot portion connecting element connected rigidly to the foot portion of the T-stringer and to the foot portion of the omega stringer, wherein the at least one foot portion connecting element is adapted on one end to have a shape corresponding to a geometric shape of the foot portion of the T-stringer and is adapted on another end to have a shape corresponding to a geometric shape of the foot portion of the omega stringer; and
two comb portion connecting elements each connected rigidly to the comb portion of the T-stringer and to the comb portion of the omega stringer, wherein the two comb portion connecting elements are each adapted on one end to have a shape corresponding to a geometric shape of the comb portion of the T-stringer and are each adapted on another end to have a shape corresponding to a geometric shape of the comb portion of the omega stringer;
wherein a center axis of the T-stringer is laterally offset with respect to a center axis of the omega stringer, and wherein one of the two comb portion connecting elements is moved upwards or downwards with respect to the other of the two comb portion connecting elements on an oblique outer surface of the omega stringer in order to compensate for the offset.

2. The system according to claim 1, wherein the shell component has at least two connected shell elements.

3. The system according to claim 1, wherein at least one foot portion of the T-stringer or the omega stringer is widened at a connection point of the T-stringer or the omega stringer.

4. The system according to claim 1, wherein the omega stringer has an additional recess running in the longitudinal direction in its upper side in a region of the omega stringer that is connected to the connecting arrangement.

5. The system according to claim 1, wherein the comb portion connecting elements are configured to be mirror-inverted about the center axis of one of the T-stringer or the omega stringer.

* * * * *